US012578026B2

(12) United States Patent
Scott et al.

(10) Patent No.: US 12,578,026 B2
(45) Date of Patent: Mar. 17, 2026

(54) DIVERTER VALVE ASSEMBLY

(71) Applicant: KOHLER MIRA LIMITED, Cheltenham (GB)

(72) Inventors: James Scott, Cheltenham (GB); James Bourne, Cheltenham (GB)

(73) Assignee: Kohler Mira Limited, Cheltenham (GB)

( * ) Notice: Subject to any disclaimer, the term of this patent is extended or adjusted under 35 U.S.C. 154(b) by 9 days.

(21) Appl. No.: 18/483,639

(22) Filed: Oct. 10, 2023

(65) Prior Publication Data

US 2024/0142004 A1 May 2, 2024

(30) Foreign Application Priority Data

Nov. 1, 2022 (GB) ..................................... 2216239

(51) Int. Cl.
| | |
|---|---|
| *F16K 11/044* | (2006.01) |
| *E03C 1/02* | (2006.01) |
| *F16K 31/04* | (2006.01) |

(52) U.S. Cl.
CPC .......... F16K 11/0445 (2013.01); E03C 1/023 (2013.01); F16K 11/044 (2013.01); F16K 31/041 (2013.01); F16K 31/047 (2013.01)

(58) Field of Classification Search
CPC .. F16K 11/0445; F16K 11/044; F16K 31/041; F16K 31/047; E03C 1/023
See application file for complete search history.

(56) References Cited

U.S. PATENT DOCUMENTS

| | | | | |
|---|---|---|---|---|
| 2013/0291975 A1* | 11/2013 | Fangmeier | .......... | F16K 11/0445 137/636.1 |
| 2018/0195780 A1* | 7/2018 | Itou | ........................ | F16K 11/048 |
| 2021/0079632 A1* | 3/2021 | Beattie | .................. | E03C 1/0408 |

FOREIGN PATENT DOCUMENTS

| | | | | | |
|---|---|---|---|---|---|
| CN | 205239937 U | * | 5/2016 | | |
| CN | 113727786 A | * | 11/2021 | ......... | B05C 11/1026 |
| EP | 4067583 A1 | * | 10/2022 | .......... | E03C 1/0405 |
| JP | 2018063071 A | * | 4/2018 | | |

* cited by examiner

*Primary Examiner* — Atif H Chaudry
(74) *Attorney, Agent, or Firm* — Husch Blackwell LLP

(57) ABSTRACT

A diverter valve assembly is provided, including a diverter valve chamber, an inlet to the diverter valve chamber, a first outlet, a second outlet, a first fluid flow path from the inlet to the first outlet, a second fluid flow path from the inlet to the second outlet, a diverter valve member, and a motor coupled to the diverter valve member. The motor drives movement of the diverter valve member within the valve chamber between a first end point and a second end point located further from the motor than the first end point. When the diverter valve member is at the first end point the second fluid flow path is open and the first fluid flow path is closed. When the diverter valve member is at the second end point the second fluid flow path is closed and the first fluid flow path is open.

18 Claims, 3 Drawing Sheets

4

DIVERTER VALVE ASSEMBLY

CROSS REFERENCE

This application claims priority to UK Application No. 2216239.0, filed Nov. 1, 2022, the entirety of which is hereby incorporated by reference.

FIELD OF THE INVENTION

This disclosure relates to a diverter valve assembly for use in an ablutionary or plumbing fitting. The disclosure also relates to an ablutionary or plumbing fitting comprising such a diverter valve assembly and to an ablutionary or plumbing system comprising such an ablutionary or plumbing fitting.

BRIEF DESCRIPTION OF THE DRAWINGS

Example embodiments will now be described with reference to the accompanying drawings, in which.

DETAILED DESCRIPTION OF THE DRAWINGS

Figure 1:
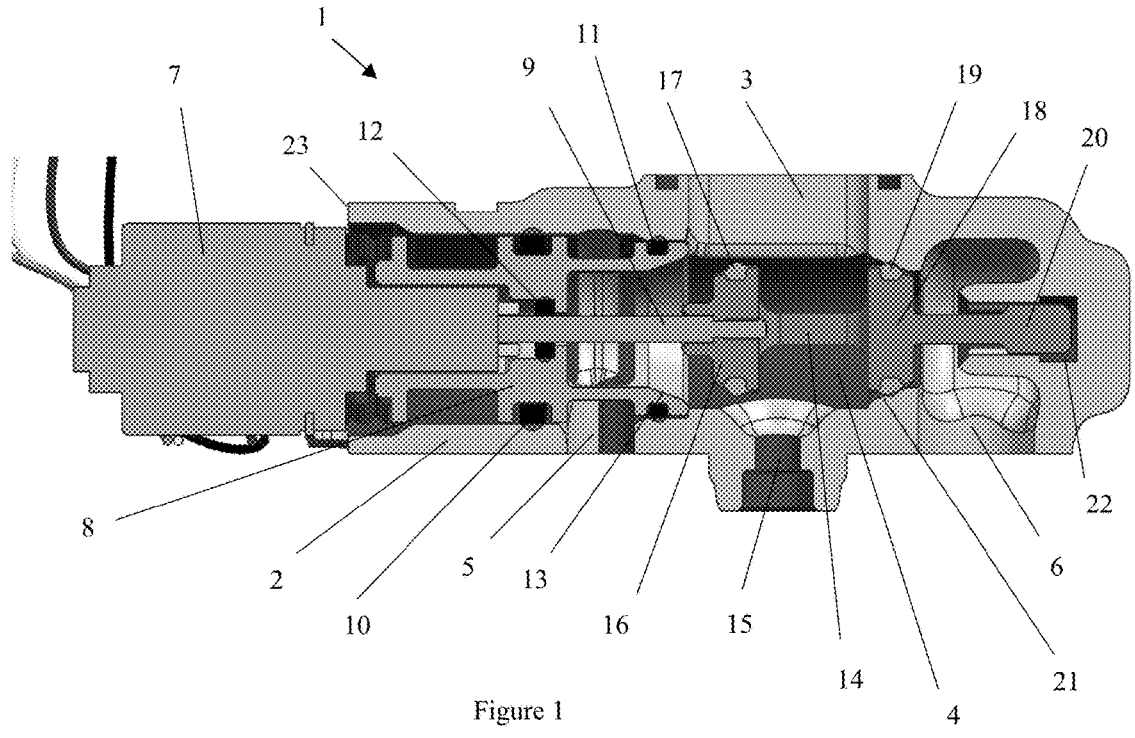
FIG. 1 shows a cross-sectional view of a diverter valve assembly.

A first aspect provides a diverter valve assembly for use in an ablutionary or plumbing fitting comprising: a diverter valve chamber; an inlet for fluid to enter the diverter valve chamber; a first outlet for fluid to exit the diverter valve chamber; a second outlet for fluid to exit the diverter valve chamber; a first fluid flow path from the inlet through the diverter valve chamber to the first outlet; a second fluid flow path from the inlet through the diverter valve chamber to the second outlet; a diverter valve member; and a motor coupled to the diverter valve member and operable to drive movement of the diverter valve member within the valve chamber between a first end point and a second end point located further from the motor than the first end point, wherein: when the diverter valve member is at the first end point the second fluid flow path is open and the first fluid flow path is closed; and when the diverter valve member is at the second end point the second fluid flow path is closed and the first fluid flow path is open.

When the diverter valve member is positioned between the first end point and the second end point, the first fluid flow path and the second fluid flow path may both be at least partially open.

At the first end point, a part of the diverter valve member may abut a first valve seat.

At the second end point, a part of the diverter valve member may abut a second valve seat.

The diverter valve member may comprise a diverter valve shaft. The diverter valve shaft may include at least one disc portion having a larger diameter than other parts of the diverter valve shaft.

The diverter valve shaft may include a first disc portion and a second disc portion. The first disc portion and the second disc portion may each have a larger diameter than other parts of the diverter valve shaft. The first disc portion may be spaced from the second disc portion by a distance along a length of the diverter valve shaft. A distance from the motor to the first disc portion may be less than a distance from the stepper motor to the second disc portion.

A first sealing member may extend around a circumference of the first disc portion. A second sealing member may extend around a circumference of the second disc portion.

The motor may be operable to drive linear movement of the diverter valve member within the valve chamber between the first end point and the second end point located further from the motor than the first end point.

The motor may comprise a stepper motor.

The motor may comprise an output shaft. The output shaft may be connected to the diverter valve member.

The diverter valve member may not be positionable to prevent fluid flow.

The diverter valve assembly may be configured so that flow rate is substantially unchanged during changeover from the first outlet to the second outlet and vice versa.

The diverter valve assembly may be configured such that the flow rate through the diverter valve chamber, i.e. from the inlet to the first outlet and/or the second outlet, remains substantially unchanged whatever the position of the diverter valve member.

The diverter valve assembly may comprise more than two outlets.

A second aspect provides a plumbing or ablutionary fitting comprising a diverter valve assembly according to the first aspect.

A third aspect provides a plumbing or ablutionary system comprising: a diverter valve assembly according to the first aspect or a plumbing or ablutionary fitting according to the second aspect; a first fluid delivery device in fluid communication with the first outlet; and a second fluid delivery device in fluid communication with the second outlet.

The plumbing or ablutionary system include a means operable to provide a fluid stream having a desired temperature and/or flow rate upstream of the diverter valve assembly.

The means operable to provide a fluid stream having a desired temperature and/or flow rate may include a mixer valve or an instantaneous water heater.

The mixer valve may be a thermostatic mixer valve.

The instantaneous water heater may be an electric instantaneous water heater.

The first fluid delivery device and/or the second fluid delivery device may comprise a sprayer for a shower.

The first fluid delivery device may comprise a shower handset and the second fluid delivery device may comprise a fixed sprayhead for a shower, e.g. a fixed overhead sprayhead for a shower.

One or more of the fluid delivery devices may comprise a faucet, a sprayer for a faucet or a spray panel for a shower system.

The ablutionary or plumbing system may comprise more than one diverter valve assembly. One or more of the diverter valve assemblies may comprise a diverter valve assembly according to the present disclosure.

The skilled person will appreciate that except where mutually exclusive, any feature described herein may be applied to any aspect and/or combined with any other feature described herein within the scope of the invention as set out in the claims.

FIG. 1 shows a cross-sectional view of a diverter valve assembly 1. The diverter valve assembly 1 includes a diverter valve body 2. A diverter valve chamber 4 is disposed within the diverter valve body 2. The diverter valve body 2 has an inlet 3 for fluid to enter, in use, the diverter valve chamber 4. The diverter valve body 2 has a first outlet 5 for fluid to exit, in use, the diverter valve chamber 4. The diverter valve body 2 has a second outlet 6 for fluid to exit, in use, the diverter valve chamber 4. The first outlet 5 and the second outlet 6 are spaced apart from each other on an opposite side of the diverter valve chamber 4 from the inlet 3. An aperture 15 for receiving a thermistor (not shown) is located between the first outlet 5 and the second outlet 6. In implementations, the diverter valve body 2 may not have an aperture for receiving a thermistor.

The diverter valve body 2 has an open end 23. A motor support insert 8 is received in the diverter valve body 2. A first o-ring 10 and a second o-ring 11 are each arranged to provide a fluid-tight seal between the motor support insert 8 and the diverter valve body 2. The first outlet 5 communicates with the diverter valve chamber 4 at a location between the first o-ring 10 and the second o-ring 11.

A stepper motor 7 configured to be connected to an electrical power supply (not shown) extends through the open end 23 into the diverter valve body 2. A portion of the stepper motor 7 is received in the motor support insert 8. The stepper motor 7 includes an output shaft 9. The output shaft 9 extends through the motor support insert 8 and into the diverter valve chamber 4. A third o-ring 12 is arranged to provide a fluid-tight seal between the output shaft 9 and the motor support insert 8.

A diverter valve member in the form of a diverter valve shaft 14 is connected to the output shaft 9. The diverter valve shaft 14 may be connected to the output shaft 9 by any suitable means, e.g. by overmoulding, use of an adhesive or use of a mechanical fastener. The diverter valve shaft 14 may be integrally formed with the output shaft 9.

The diverter valve shaft 14 extends across the diverter valve chamber 4. A distal end portion 20 of the diverter valve shaft 14 is disposed within a guide channel 22 provided by the diverter valve body 2.

The diverter valve shaft 14 includes a first disc portion 16 and a second disc portion 18. The first disc portion 16 and the second disc portion 18 each have a larger diameter than other parts of the diverter valve shaft 14. The first disc portion 16 is spaced from the second disc portion 18 by a distance along a length of the diverter valve shaft 14. A distance from the stepper motor 7 to the first disc portion 16 is less than a distance from the stepper motor 7 to the second disc portion 18.

A first sealing member 17 extends around a circumference of the first disc portion 16. A second sealing member 19 extends around a circumference of the second disc portion 18.

The stepper motor 7 is operable to drive linear movement of the diverter valve shaft 14 within the diverter valve chamber 4 between a first end point and a second end point located further from the stepper motor than the first end point.

When the diverter valve shaft 14 is at the first end point, the first disc portion 16 abuts a first valve seat 13. When the first disc portion 16 abuts the first valve seat 13. the first sealing member 17 acts to provide a fluid-tight seal between the first disc portion 16 and the first valve seat 13. The motor support insert 8 includes the first valve seat 13.

When the diverter valve shaft 14 is at the second end point, the second disc portion 18 abuts a second valve seat 21. When the second disc portion 18 abuts the second valve seat 21, the second sealing member 19 acts to provide a fluid-tight seal between the second disc portion 18 and the second valve seat 15. The diverter valve body 2 includes the second valve seat 21.

In an implementation, the diverter valve body may include the first valve seat and the second valve seat.

Movement of the diverter valve shaft 14 opens and closes a first fluid flow path from the inlet 3 through the diverter valve chamber 4 to the first outlet 5 and a second fluid flow path from the inlet 3 through the diverter valve chamber 4 to the second outlet 6. By controlling movement of the diverter valve shaft 14 within the diverter valve chamber 4, a user may select, in use, between the first fluid flow path or the second fluid flow path.

Figure 2:
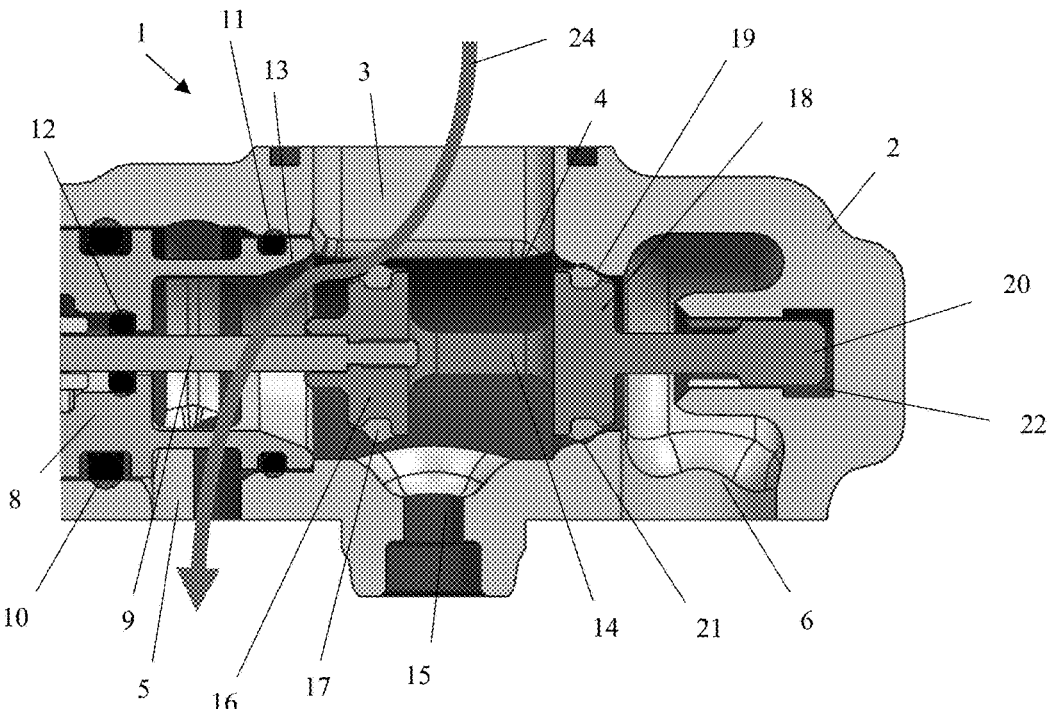
FIG. 2 is a cross-sectional view of a portion of the diverter valve assembly of FIG. 1 when a first fluid flow path is open and a second fluid flow path is closed.

FIG. 2 shows the diverter valve shaft 14 at the second end point. When the diverter valve shaft 14 is at the second end point the second fluid flow path is closed and the first fluid flow path is open. An arrow 24 indicates the first fluid flow path.

Figure 3:
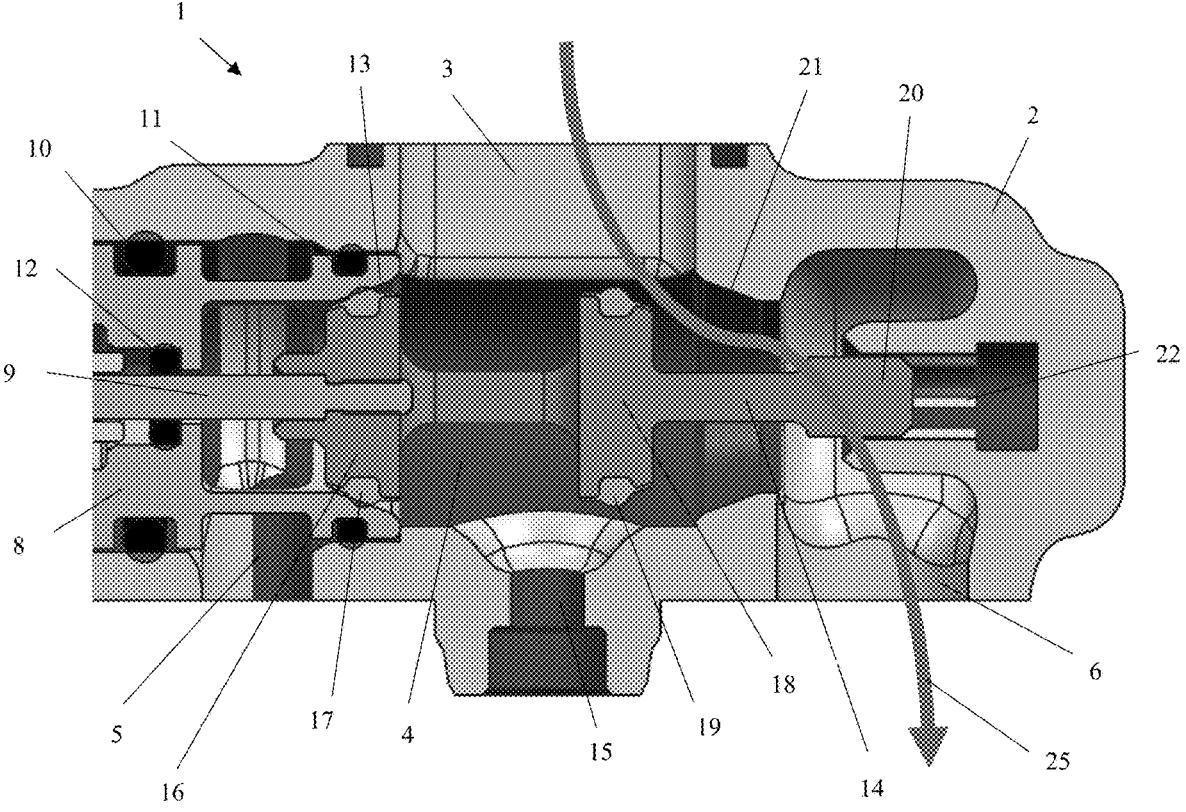
FIG. 3 is a cross-sectional view of a portion of the diverter valve assembly of FIG. 1 when a second fluid flow path is open and a first fluid flow path is closed.

FIG. 3 shows the diverter valve shaft 14 at the first end point. When the diverter valve shaft 14 is at the first end point the first fluid flow path is closed and the second fluid flow path is open. An arrow 25 indicates the second fluid flow path.

When the diverter valve shaft 14 is positioned between the first end point and the second end point, the first fluid flow path and the second fluid flow path may both be at least partially open. The proportions of fluid flowing along the first fluid flow path and the second fluid flow path may vary depending upon the position of the diverter valve shaft 14 between the first end point and the second end point. For instance, when the diverter valve shaft 14 is located midway between the first end point and the second end point, then there may be equal proportions of fluid flowing along the first fluid flow path and the second fluid flow path.

The diverter valve assembly 1 may be configured such that the flow rate through the diverter valve chamber 4, i.e. from the inlet 3 to the first outlet 5 and/or the second outlet 6, remains substantially unchanged whatever the position of the diverter valve shaft 14.

Figure 4:
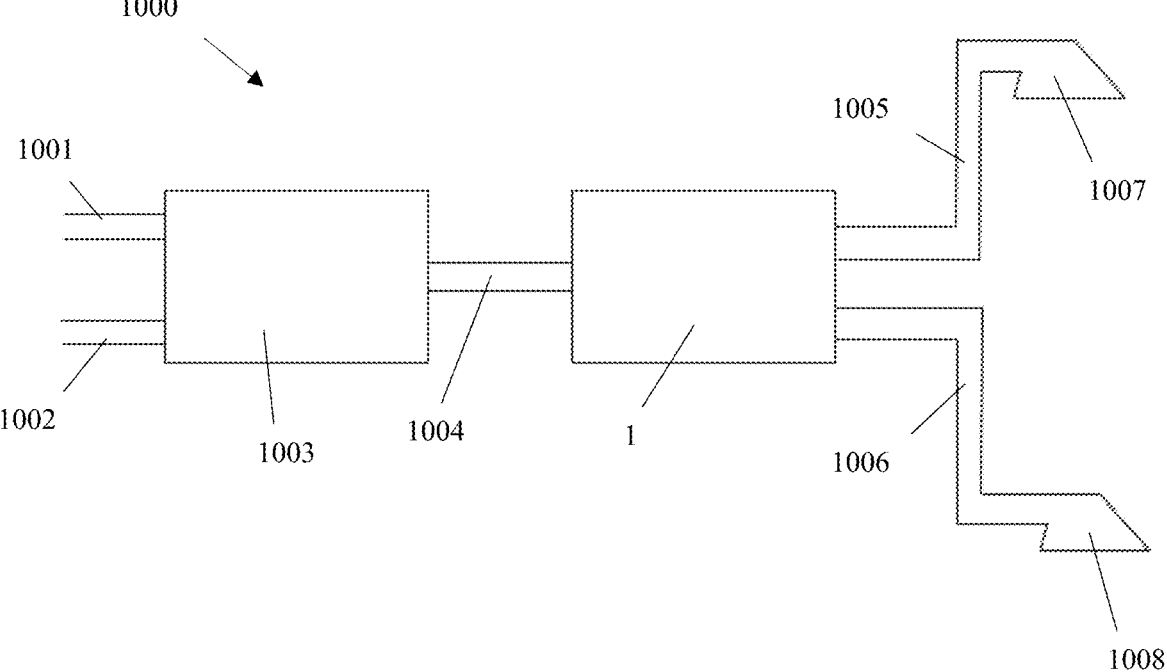
FIG. 4 shows schematically an example of an ablutionary system including the diverter valve assembly of FIGS. 1, 2 and 3.

FIG. 4 illustrates schematically an ablutionary system 1000 including the diverter valve assembly 1.

A first supply pipe 1001 carries a flow of hot water to a mixer valve 1003. A second supply pipe 1002 carries a flow of cold water to the mixer valve 1003. The mixer valve 1003 is operable to mix the flows of hot water and cold water to provide a mixed flow having a user-desired temperature and, optionally, flow rate. For example, the mixer valve 1003 may be a thermostatic mixer valve.

The mixed flow exits the mixer valve 1003 via a mixer valve outlet. An input pipe 1004 connects the mixer valve outlet to the inlet 3 (FIGS. 1, 2 and 3) of the diverter valve assembly 1. The input pipe 1004 carries the mixed flow from the mixer valve 1003 to the diverter valve assembly 1.

A first output conduit 1005 connects the first outlet 5 (FIGS. 1, 2 and 3) of the diverter valve assembly 1 to a first fluid delivery device 1007. A second output conduit 1006 connects the second outlet 6 (FIGS. 1, 2 and 3) of the diverter valve assembly to a second fluid delivery device 1008. The first fluid delivery device 1007 and/or the second fluid delivery device 1008 may comprise a sprayer for a shower. In an implementation, the first fluid delivery device 1007 may comprise a shower handset and the second fluid delivery device 1008 may comprise a fixed sprayhead for a shower, e.g. a fixed overhead sprayhead for a shower. In some implementations, one or more of the fluid delivery devices may comprise a faucet, a sprayer for a faucet or a spray panel for a shower system.

In some implementations, the ablutionary system may comprise an instantaneous water heater, e.g. an electric instantaneous water heater. The instantaneous water heater may be configured to receive a single inlet flow of cold water. The instantaneous water heater may comprise a heater tank operable to heat water to a user-desired temperature as it passes through the heater tank from a heater tank inlet to a heater tank outlet. For instance, the heater tank may include one or more electric heating elements.

The ablutionary system may comprise an instantaneous water heater in place of the mixer valve 1003.

It will be appreciated that a mixer valve and an instantaneous water heater both constitute examples of a means operable to provide a fluid stream having a desired temperature and/or flow rate. Any suitable means operable to provide a fluid stream having a desired temperature and/or flow rate may be employed in an ablutionary or plumbing system according to the present disclosure.

The means operable to provide a fluid stream having a desired temperature and/or flow rate and the diverter valve assembly may or may not be part of a single ablutionary or plumbing fitting or may or may not be housed at least partially within a common casing.

In some implementations, the ablutionary or plumbing system may not include a means operable to provide a fluid stream having a desired temperature and/or flow rate upstream of the diverter valve assembly.

An ablutionary or plumbing system according to the present disclosure may comprise more than one diverter valve assembly. One or more of the diverter valve assemblies may comprise a diverter valve assembly according to the present disclosure.

A diverter valve assembly according to the present disclosure may comprise more than two outlets.

It will be understood that the invention is not limited to the embodiments described above. Various modifications and improvements can be made without departing from the concepts disclosed herein. Except where mutually exclusive, any of the features may be employed separately or in combination with any other features and the disclosure extends to all combinations and sub-combinations of one or more features disclosed herein within the scope of the invention as set out in the claims.

The invention claimed is:

1. A diverter valve assembly comprising:
a diverter valve body having an open end;
a diverter valve chamber within the diverter valve body;
an inlet in fluid communication with the diverter valve chamber;
a first outlet in fluid communication with the diverter valve chamber via a first passage defined by a first valve seat;
a second outlet in fluid communication with the diverter valve chamber via a second passage defined by a second valve seat;
a first fluid flow path from the inlet through the diverter valve chamber and the first passage to the first outlet;
a second fluid flow path from the inlet through the diverter valve chamber and the second passage to the second outlet;
a diverter valve member comprising a first disc portion and a second disc portion, the first and second disc portions being moveably positioned in the diverter valve chamber between the first and second valve seats;
a motor extending into the open end of the diverter valve body, the motor comprising an output shaft coupled to the diverter valve member, the output shaft extending into the diverter valve chamber, the motor driving movement of the diverter valve member within the diverter valve chamber between a first end point and a second end point located farther from the motor than the first end point, wherein:
when the diverter valve member is at the first end point the second fluid flow path is open and the first disc portion abuts the first valve seat to close the first fluid flow path; and
when the diverter valve member is at the second end point the second disc portion abuts the second valve seat to close the second fluid flow path and the first fluid flow path is open; and
a motor support insert received in the diverter valve body, the motor support insert receiving the motor in the diverter valve body, wherein the motor support insert defines the first valve seat and the first passage.

2. The diverter valve assembly of claim 1, wherein the diverter valve member comprises a diverter valve shaft.

3. The diverter valve assembly of claim 2, wherein the first and second disc portions have a larger diameter than the diverter valve shaft.

4. The diverter valve assembly of claim 2, wherein the first disc portion is spaced from the second disc portion by a distance along a length of the diverter valve shaft.

5. The diverter valve assembly of claim 2, wherein the diverter valve shaft has a distal end portion that is disposed within a guide channel provided by the diverter valve assembly.

6. The diverter valve assembly of claim 1, wherein a distance from the motor to the first disc portion is shorter than a distance from the motor to the second disc portion.

7. The diverter valve assembly of claim 1, wherein the motor drives linear movement of the diverter valve member within the diverter valve chamber between the first end point and the second end point located farther from the motor than the first end point.

8. The diverter valve assembly of claim 1, wherein the motor comprises a stepper motor.

9. The diverter valve assembly of claim 1, wherein when the diverter valve member is positioned between the first end point and the second end point, the first fluid flow path and the second fluid flow path are both at least partially open.

10. The diverter valve assembly of claim 1, wherein a flow rate through the diverter valve chamber remains substantially unchanged irrespective of the position of the diverter valve member.

11. A plumbing or ablutionary fitting comprising the diverter valve assembly according to claim 1.

12. The diverter valve assembly of claim 1, wherein a first sealing member extends around a circumference of the first disc portion and a second sealing member extends around a circumference of the second disc portion, wherein the first sealing member operates to provide a fluid-tight seal when the first disc portion abuts the first valve seat, and wherein the second sealing member operates to provide a fluid-tight seal when the second disc portion abuts the second valve seat.

13. The diverter valve assembly of claim 1, wherein a fluid-tight seal is formed between the motor support insert and the diverter valve body and a fluid-tight seal is formed between the motor support insert and the output shaft.

14. A plumbing or ablutionary system comprising:
a diverter valve assembly including:
a diverter valve chamber defined within a diverter valve body between a first valve seat and a second valve seat, the diverter valve chamber having a first flow path from an inlet to a first outlet through the first valve seat, and having a second flow path from the inlet to a second outlet through the second valve seat;

a diverter valve member driven between a first position and a second position by a motor extending into an open end of the diverter valve body, the motor comprising an output shaft coupled to the diverter valve member, the output shaft extending into the diverter valve chamber, the diverter valve member comprising a first disc portion and a second disc portion, the first and second disc portions being moveably positioned in the diverter valve chamber between the first and second valve seats, wherein:

when the diverter valve member is in the first position, the second flow path is open and the first disc portion abuts the first valve seat to close the first flow path; and when the diverter valve member is in the second position, the second disc portion abuts the second valve seat to close the second flow path and the first flow path is open; and a motor support insert received in the diverter valve body, the motor support insert receiving the motor in the diverter valve body, wherein the motor support insert defines the first valve seat, and wherein the first flow path extends through the motor support insert;

a first fluid delivery device in fluid communication with the first outlet; and a second fluid delivery device in fluid communication with the second outlet.

15. The plumbing or ablutionary system of claim 14 including a mechanism providing a fluid stream having a desired temperature and/or flow rate upstream of the diverter valve assembly.

16. The plumbing or ablutionary system of claim 14, wherein the first fluid delivery device and/or the second fluid delivery device comprise a sprayer for a shower.

17. A diverter valve assembly comprising:

a diverter valve member housed in a diverter valve chamber defined within a diverter valve body between a first valve seat and a second valve seat, the diverter valve member comprising a first disc portion and a second disc portion, the first and second disc portions being positioned between the first and second valve seats, the diverter valve member having a first position and a second position, wherein:

in the first position, the first disc portion abuts the first valve seat such that the diverter valve member blocks fluid flowing through the diverter valve chamber to a first outlet, and in the second position, the second disc portion abuts the second valve seat such that the diverter valve member blocks fluid flowing through the diverter valve chamber to a second outlet;

a motor extending into an open end of the diverter valve body and comprising an output shaft coupled to the diverter valve member, the output shaft extending into the diverter valve chamber, the motor driving movement of the diverter valve member between the first position and the second position; and a motor support insert received in the diverter valve body, the motor support insert receiving the motor in the diverter valve body, wherein the motor support insert defines the first valve seat and a flow path between the diverter valve chamber and the first outlet.

18. The diverter valve assembly of claim 17, wherein when the diverter valve member is between the first position and the second position, fluid is not fully blocked to either the first outlet or the second outlet.

* * * * *